(12) United States Patent
Yokota et al.

(10) Patent No.: US 6,339,561 B2
(45) Date of Patent: *Jan. 15, 2002

(54) REPRODUCTION APPARATUS AND METHOD OF DISPLAYING DATA IN SELECTED LANGUAGE

(75) Inventors: Teppei Yokota; Hideko Kimura, both of Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,608

(22) Filed: Jun. 15, 1998

(30) Foreign Application Priority Data

Jun. 19, 1997 (JP) .............................. 9-162808

(51) Int. Cl.[7] .............................. G11B 27/36; H04N 5/91
(52) U.S. Cl. .............................. 369/30.25; 369/30.08; 369/30.27; 369/30.3; 369/47.21; 369/47.23; 369/53.22; 386/95
(58) Field of Search .............................. 369/32, 49, 58, 369/30.08, 30.25, 30.27, 30.3, 47.21, 47.23, 53.22; 386/95–97

(56) References Cited

U.S. PATENT DOCUMENTS

| 5,280,572 A | * | 1/1994 | Case et al. ..................... 369/49 |
| 5,499,221 A | * | 3/1996 | Ito et al. ........................ 386/95 |
| 5,548,509 A | * | 8/1996 | Takagi ....................... 369/54 X |
| 5,587,979 A | * | 12/1996 | Bluthgen ..................... 369/32 |
| 5,652,824 A | * | 7/1997 | Hirayama et al. ............. 386/95 |
| 5,745,454 A | * | 4/1998 | Yokota ........................ 369/48 |
| 5,835,669 A | * | 11/1998 | Hirayama et al. ............. 386/97 |
| 5,835,670 A | * | 11/1998 | Hirayama et al. ............. 386/97 |
| 6,009,382 A | * | 12/1999 | Martino et al. ................ 704/1 |

FOREIGN PATENT DOCUMENTS

| EP | 0325325 A2 | | 7/1989 |
| WO | WO95/12198 | * | 5/1995 |

* cited by examiner

Primary Examiner—Aristotelis M. Psitos
(74) Attorney, Agent, or Firm—Oblon, Spivak, McClelland, Maier & Neustadt, P.C.

(57) ABSTRACT

The present invention is a reproducing apparatus that reproduces data from a record medium on which text information such as a title of a program is recorded in a plurality of languages and identifiers for identifying recorded languages are recorded as codes wherein a language that has been designated is used as a default language. Thus, without need to designate a language, text information in the default language is automatically read from a record medium and displayed.

6 Claims, 23 Drawing Sheets

Fig. 4

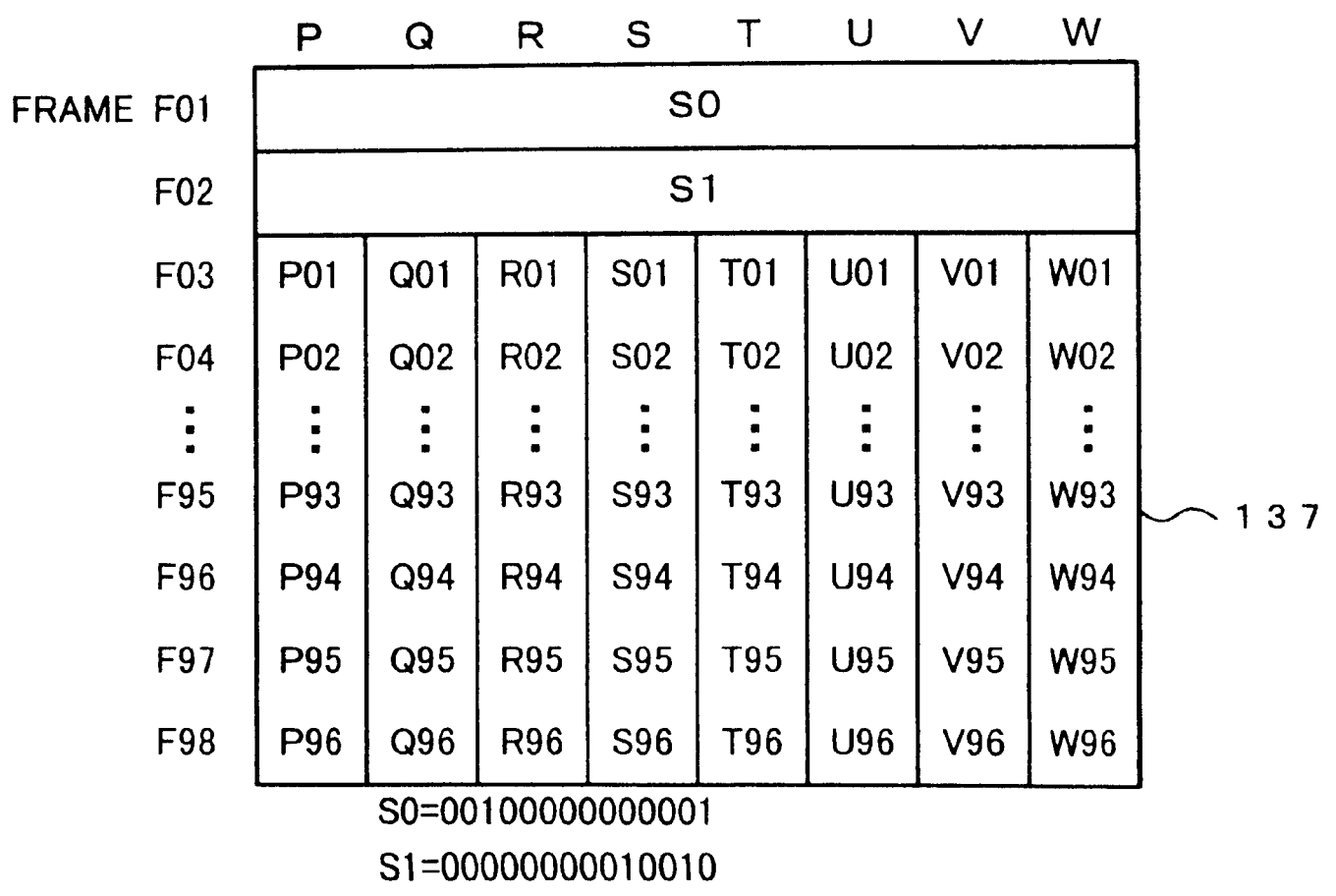

| FRAME | P | Q | R | S | T | U | V | W |
|---|---|---|---|---|---|---|---|---|
| F01 | S0 | | | | | | | |
| F02 | S1 | | | | | | | |
| F03 | P01 | Q01 | R01 | S01 | T01 | U01 | V01 | W01 |
| F04 | P02 | Q02 | R02 | S02 | T02 | U02 | V02 | W02 |
| ... | ... | ... | ... | ... | ... | ... | ... | ... |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

137

S0=0010000000000001
S1=0000000000010010

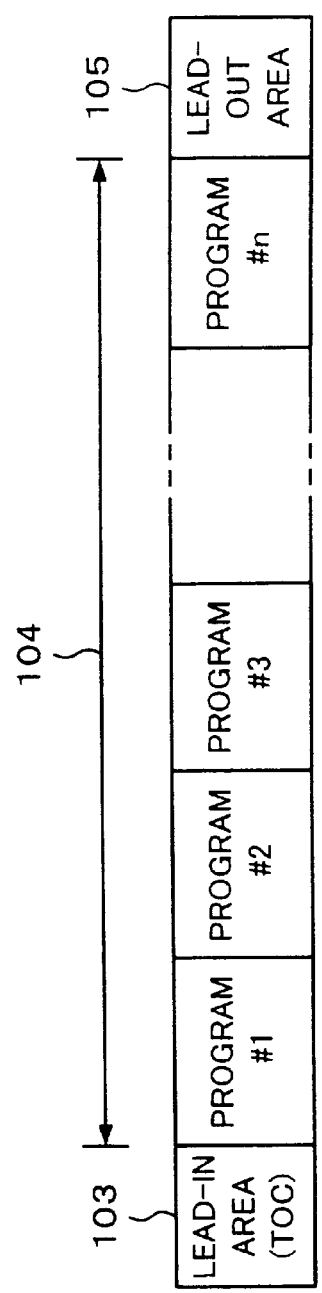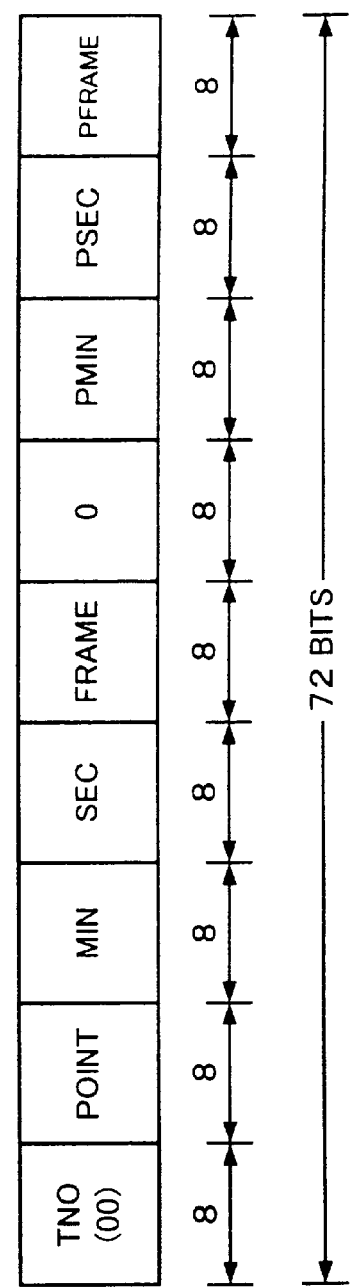

Fig. 6

| TNO | BLOCK | POINT | PMIN,PSEC,PFRAME | |
|---|---|---|---|---|
| 00 | n | 01 | 00. 02. 32 | START POINT OF TRACK #1 |
| | n + 1 | 01 | 00. 02. 32 | |
| | n + 2 | 01 | 00. 02. 32 | |
| | n + 3 | 02 | 10. 15. 12 | START POINT OF TRACK #2 |
| | n + 4 | 02 | 10. 15. 12 | |
| | n + 5 | 02 | 10. 15. 12 | |
| | n + 6 | 03 | 16. 28. 63 | START POINT OF TRACK #3 |
| | n + 7 | 03 | 16. 28. 63 | |
| | n + 8 | 03 | 16. 28. 63 | |
| | n + 9 | 04 | . . | |
| | n + 10 | 04 | . . | |
| | n + 11 | 04 | . . | |
| | n + 12 | 05 | . . | |
| | n + 13 | 05 | . . | |
| | n + 14 | 05 | . . | |
| | n + 15 | 06 | 19. 00. 03 | START POINT OF TRACK #6 |
| | n + 16 | 06 | 19. 00. 03 | |
| | n + 17 | 06 | 19. 00. 03 | |
| | n + 18 | A0 | 01. 00. 00 | TRACK NUMBER OF FIRST TRACK OF DISC |
| | n + 19 | A0 | 01. 00. 00 | |
| | n + 20 | A0 | 01. 00. 00 | |
| | n + 21 | A1 | 06. 00. 00 | TRACK NUMBER OF LAST TRACK OF DISC |
| | n + 22 | A1 | 06. 00. 00 | |
| | n + 23 | A1 | 06. 00. 00 | |
| | n + 24 | A2 | 52. 48. 41 | START POINT OF LEAD-OUT AREA |
| | n + 25 | A2 | 52. 48. 41 | |
| 00 | n + 26 | A2 | 52. 48. 41 | |
| 00 | n + 27 | 01 | 00. 02. 32 | REPEATED |
| | n + 28 | 01 | 00. 02. 32 | |
| | | | . . | |
| | | | . . | |

ITEM
80h=ALBUM NAME/PROGRAM NAME
81h=PERFORMER NAME/CONDUCTOR
       NAME/ORCHESTRA NAME
82h=SONGWRITER NAME
83h=COMPOSER NAME
84h=ARRANGER NAME
85h=MESSAGE
86h=DISC ID
87h=SEARCH KEYWORD
88h=TOC
89h=2ND TOC
8ah=RESERVED
8bh=RESERVED
8ch=RESERVED
8dh=CLOSED INFORMATION
8eh=UPC/EAN AND ISRS
8fh=SIZE OF BLOCK

Track No(1 to 99 00h to 63h)

IN-BLOCK SEQUENCE NO. 00 TO 255 ( 0 TO FFh)

DBCCSBCC IDENTIFIER

DBCC BLOCK NUMBER

CHARACTER POSITION OF CURRENT PACK

0000 = FIRST CHARACTER
0001 = SECOND CHARACTER
0010 = THIRD CHARACTER
0011 = FOURTH CHARACTER
0100 = FIFTH CHARACTER
0101 = SIXTH CHARACTER

1110 = 15-TH CHARACTER
1111 = 16-TH OR LATER CHARACTER

FIG. 15A

| ID1 | ID2 | ID3 | ID4 | text1 | text2 | text3 | text4 |
|---|---|---|---|---|---|---|---|
| 8fh | PACK ELEMENT 00h | SEQUENCE NO. | BLOCK NO. | CHARACTER CODE OF CURRENT BLOCK | FIRST TRACK NO. | LAST TRACK NO. | MODE 2 & COPY PROTECTION FLAG |

FIG. 15B

| text5 | text6 | text7 | text8 | text9 | text10 | text11 | text12 | CRC |
|---|---|---|---|---|---|---|---|---|
| NUMBER OF PACKS (ID1=80h) | NUMBER OF PACKS (ID1=81h) | NUMBER OF PACKS (ID1=82h) | NUMBER OF PACKS (ID1=83h) | NUMBER OF PACKS (ID1=84h) | NUMBER OF PACKS (ID1=85h) | NUMBER OF PACKS (ID1=86h) | NUMBER OF PACKS (ID1=87h) | |

| ID1 | ID2 | ID3 | ID4 | text1 | text2 | text3 | text4 |
|---|---|---|---|---|---|---|---|
| 8fh | PACK ELEMENT 01h | SEQUENCE NO. | BLOCK NO. | NUMBER OF PACKS (ID1=88h) | NUMBER OF PACKS (ID1=89h) | NUMBER OF PACKS (ID1=8ah) | NUMBER OF PACKS (ID1=8bh) |

FIG. 16A

| text5 | text6 | text7 | text8 | text9 | text10 | text11 | text12 | CRC |
|---|---|---|---|---|---|---|---|---|
| NUMBER OF PACKS (ID1=8ch) | NUMBER OF PACKS (ID1=8dh) | NUMBER OF PACKS (ID1=8eh) | NUMBER OF PACKS (ID1=8fh) | LAST SEQUENCE NO. OF BLOCK 0 | LAST SEQUENCE NO. OF BLOCK 1 | LAST SEQUENCE NO. OF BLOCK 2 | LAST SEQUENCE NO. OF BLOCK 3 | |

| ID1 | ID2 | ID3 | ID4 | text1 | text2 | text3 | text4 |
|---|---|---|---|---|---|---|---|
| 8fh | PACK ELEMENT 00h | SEQUENCE NO. | BLOCK NO. | LAST SEQUENCE NO. OF BLOCK 4 | LAST SEQUENCE NO. OF BLOCK 5 | LAST SEQUENCE NO. OF BLOCK 6 | LAST SEQUENCE NO. OF BLOCK 7 |

FIG. 17B

| text5 | text6 | text7 | text8 | text9 | text10 | text11 | text12 | CRC |
|---|---|---|---|---|---|---|---|---|
| LANGU- AGE CODE OF BLOCK 0 | LANGU- AGE CODE OF BLOCK 1 | LANGU- AGE CODE OF BLOCK 2 | LANGU- AGE CODE OF BLOCK 3 | LANGU- AGE CODE OF BLOCK 4 | LANGU- AGE CODE OF BLOCK 5 | LANGU- AGE CODE OF BLOCK 6 | LANGU- AGE CODE OF BLOCK 7 | |

Fig. 18

| LANGUAGE CODE (HEXADECIMAL) | LANGUAGE | LANGUAGE CODE (HEXADECIMAL) | LANGUAGE |
|---|---|---|---|
| 00 | Unknown/not applicable | 20 | Polish |
| 01 | Albanian | 21 | Portuguese |
| 02 | Breton | 22 | Romanian |
| 03 | Catalan | 23 | Romansh |
| 04 | Croatian | 24 | Serbian |
| 05 | Welsh | 25 | Slovak |
| 06 | Czech | 26 | Slovene |
| 07 | Danish | 27 | Finnish |
| 08 | German | 28 | Swedish |
| 09 | English | 29 | Turkish |
| 0A | Spanish | 2A | Flemish |
| 0B | Esperanto | 2B | Walloon |
| 0C | Estonian | 2C | |
| 0D | Basque | 2D | |
| 0E | Faroese | 2E | |
| 0F | French | 2F | ⎯⎞ |
| 10 | Frisian | 30 | ⎟ |
| 11 | Irish | 31 | ⎟ |
| 12 | Gaelic | 32 | ⎟ |
| 13 | Galician | 33 | ⎟ |
| 14 | Icelandic | 34 | ⎟ |
| 15 | Italian | 35 | ⎟ |
| 16 | Lappish | 36 | ⎟ |
| 17 | Latin | 37 | ⎬ Reserved for |
| 18 | Latvian | 38 | national assignment |
| 19 | Luxembourgian | 39 | ⎟ |
| 1A | Lithuanian | 3A | ⎟ |
| 1B | Hungarian | 3B | ⎟ |
| 1C | Maltese | 3C | ⎟ |
| 1D | Dutch | 3D | ⎟ |
| 1E | Norwegian | 3E | ⎟ |
| 1F | Occitan | 3F | ⎯⎠ |

Fig. 19

| LANGUAGE CODE (HEXADECIMAL) | LANGUAGE | LANGUAGE CODE (HEXADECIMAL) | LANGUAGE |
|---|---|---|---|
| 7F | Amharic | 5F | Marathi |
| 7E | Arabic | 5E | Ndebele |
| 7D | Armenian | 5D | Nepali |
| 7C | Assamese | 5C | Oriya |
| 7B | Azerbijani | 5B | Papamiento |
| 7A | Bambora | 5A | Persian |
| 79 | Belorussian | 59 | Punjabi |
| 78 | Bengali | 58 | Pushtu |
| 77 | Bulgarian | 57 | Quechua |
| 76 | Burmese | 56 | Russian |
| 75 | Chinese | 55 | Ruthenian |
| 74 | Churash | 54 | Serbo-Croatian |
| 73 | Dari | 53 | Shona |
| 72 | Fulani | 52 | Sinhalese |
| 71 | Georgian | 51 | Somali |
| 70 | Greek | 50 | Sranan Tor |
| 6F | Gujurati | 4F | Swahili |
| 6E | Gurani | 4E | Tadzhik |
| 6D | Hausa | 4D | Tamil |
| 6C | Hebrew | 4C | Tatar |
| 6B | Hindi | 4B | Telugu |
| 6A | Indonesian | 4A | Thai |
| 69 | Japanese | 49 | Ukrainian |
| 68 | Kannada | 48 | Urdu |
| 67 | Kazakh | 47 | Uzbek |
| 66 | Khmer | 46 | Vietnamese |
| 65 | Korean | 45 | Zulu |
| 64 | Laotian | 44 | |
| 63 | Macedonian | 43 | |
| 62 | Malagasay | 42 | |
| 61 | Malaysian | 41 | |
| 60 | Moldavian | 40 | |

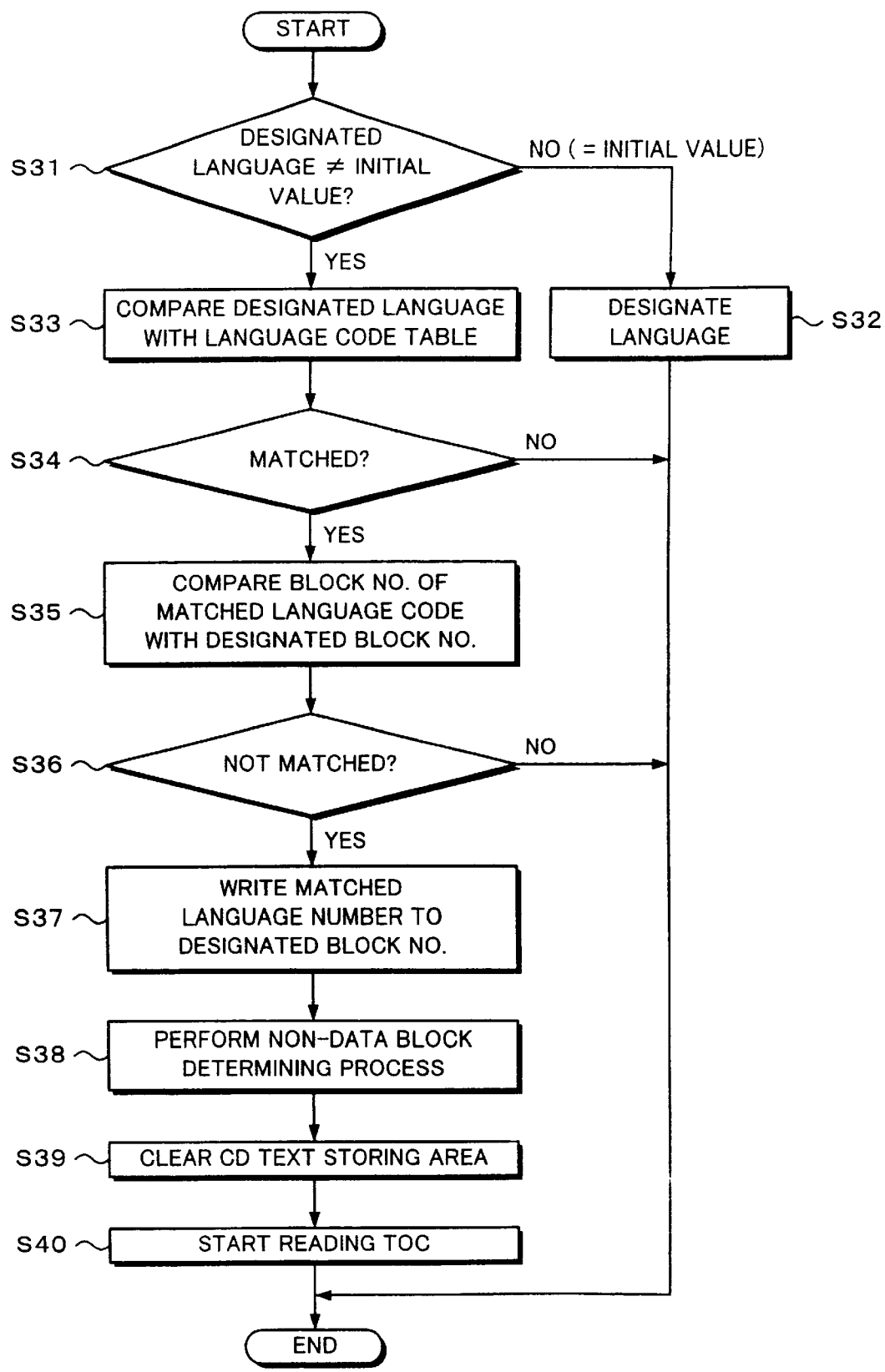

REPRODUCTION APPARATUS AND METHOD OF DISPLAYING DATA IN SELECTED LANGUAGE

BACKGROUND OF THE INVENTION

1. Field of the Invention

The present invention relates to a reproducing apparatus for a record medium such as a digital audio optical disc on which subcode has been recorded along with main data such as audio data and visual data.

2. Description of the Related Art

In a CD reproducing apparatus on which audio information has been recorded, various reproduction information is displayed for user's reference. Examples of such reproduction information are a track number and time information corresponding thereto. The reproduction information is recorded as mode 1 of Q channel of subcode.

Recently, a reproducing apparatus that uses R to W channels of subcode recorded in a lead-in area for character information such as an album title corresponding to a disc has been proposed. Such a disc is referred to as CD-TEXT disc. As formats of CD-TEXT discs, lead-in information (mode 4) and program area information (mode 2) have been defined. When the TOC of a CD-TEXT disc is read, the lead-in information is stored in a memory (RAM) of the reproducing apparatus. The user can see the lead-in information with a proper operation of the apparatus. On the other hand, program area information is displayed at a timing designated by the producer of the CD-TEXT disc without need to use a memory. In the following description, the mode 4 of the CD-TEXT disc will be mainly described.

When a CD-TEXT disc is loaded to the apparatus, CD text information is read. The CD text information is decoded and stored in the memory of the reproducing apparatus. When necessary, the decoded character information is displayed. Thus, since the album title, performers, and so forth of the CD-TEXT disc are displayed, the user can know the content thereof at a glance.

In the CD-TEXT disc format, information of up to 6500 characters can be recorded. Since information such as album titles of most CD-TEXT discs is 800 characters or less, character information in up to eight languages can be recorded. As will be described later, in the CD-TEXT disc format, a text group is composed of block 0 to block 7 corresponding to up to eight languages. In each block, one character code is used. In the format, the block 0 should be present. In the case that the storage capacity of a memory of a reproducing apparatus is insufficient, only the block 0 is selected and read with priority. Thus, major languages are successively assigned to blocks in the order of lower block numbers.

As described above, since information in only a particular language (for example, block 0) is automatically read to a memory, information of other languages (other blocks) recorded on a CD cannot be used. In addition, when text information in a plurality of languages is read to the memory, since a priority language has been designated, if the priority language does not match a user's desired language, the user should designate the desired language. Thus, the user's language determinating operation becomes complicated.

OBJECTS AND SUMMARY OF THE INVENTION

Therefore, an object of the present invention is to provide a reproducing apparatus that designates a priority language and automatically reads text information in the designated language from a disc such as a CD-TEXT disc on which text information has been recorded in a plurality of languages.

A first aspect of the present invention is a reproducing apparatus for reproducing at least one program, text information corresponding thereto, and a language code for determining a language corresponding to the text information from a record medium, the record medium having a program area on which the program is recorded and a management area on which the text information and the language code are recorded, the reproducing apparatus comprising designating means for designating the language code corresponding to an operation of the user, a memory means for storing the language code, a comparison means for comparing the language code stored in the memory means with the language code reproduced from the record medium, and a reproducing means for reproducing the text information in the language designated by the designating means from the record medium when the compared results are matched.

A second aspect of the present invention is a reproducing method for reproducing at least one program, text information corresponding thereto, and a language code for determining a language corresponding to the text information from a record medium, the record medium having a program area on which the program is recorded and a management area on which the text information and the language code are recorded, the reproducing method comprising the steps of (a) designating the language code corresponding to an operation of the user, (b) storing the language code to memory, (c) comparing the language code stored in the memory with the language code reproduced from the record medium, and (d) reproducing the text information in the language designated by step (a) from the record medium when the compared results are matched.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a schematic diagram showing the data structure of all channels of a subcode signal according to the present invention;

FIG. 5A is a schematic diagram showing the structure of a data area recorded on the optical disc;

FIG. 5B is a schematic diagram showing the data structure of table-of-content data recorded in a lead-in area;

FIG. 6 is a table showing an example of table-of-content data recorded in the lead-in area according to the present invention;

FIG. 15 is a schematic diagram showing the data structure of a pack in the case that the pack element number represented by ID2 is 00h;

FIG. 16 is a schematic diagram showing the data structure of a pack in the case that the pack element number represented by ID2 is 01h;

FIG. 17 is a schematic diagram showing the data structure of a pack in the case that the pack element number represented by ID2 is 02h;

FIG. 18 is a table showing the relation between language codes used in Europa and language names;

FIG. 19 is a table showing the relation between language codes used in other countries and language names;

FIG. 25 is a flow chart showing a language code determining process for referencing a designated language reproduced from a disc and a language table stored in a memory and initiatively reading the designated language.

DETAILED DESCRIPTION OF THE PREFERRED EMBODIMENTS

Next, with reference to the accompanying drawings, an embodiment of the present invention will be described. In the embodiment, a CD-TEXT disc is used as a disc shaped record medium. However, the present invention can be applied to other record mediums such as another type optical disc (for example, a digital video disc (DVD)), a magnetic disc, an optical tape, and a semiconductor memory. In addition, digital main information recorded on a record medium is not limited to audio data. Instead, the digital main data may be video data or the like.

Figure 1:
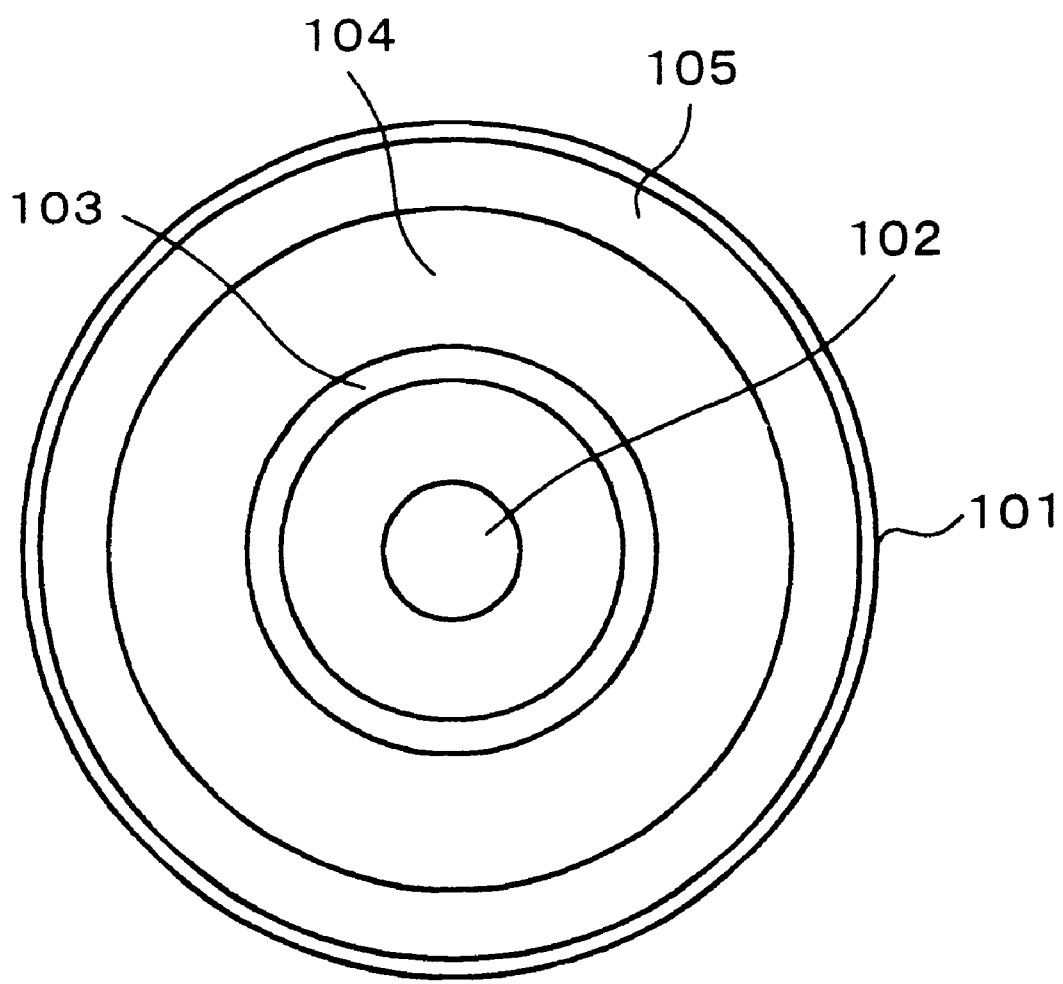
FIG. 1 is a schematic diagram showing an optical disc according to the present invention.

For easy understanding of the present invention, the data structure of an audio CD-TEXT disc 101 will be described. Referring to FIG. 1, a CD-TEXT disc 101 has a hole 102 at the center thereof. The CD-TEXT disc 101 has a lead-in area 103, a program area 104, and a lead-out area 105 that are formed from the inner periphery to the outer periphery. The lead-in area 103 is a program management area in which TOC (Table Of Contents) information is recorded. The program area 104 is an area in which program data is recorded. The lead-out area 105 is a program end area. In the audio CD-TEXT disc 101, audio data is recorded in the program area 104. Time information and so forth for the audio data is managed in the lead-in area 103. When the CD reproducing apparatus has read audio data in the program area 104 and the pickup has reached the lead-out area 105, the CD reproducing apparatus completes the reproducing operation of the CD-TEXT disc.

On a compact disc, a subcode is recorded along with audio data that is main data. Next, data of P and Q channels of subcode will be described. The audio signal of the compact disc is sampled at a sampling frequency of 44.1 kHz. In the sampled data, one sample or one word of 16 bits is divided into two symbols of high order 8 bits and low order 8 bits. An error correction encoding process and an interleaving process are performed for each symbol. 24 symbols of the audio data are formed as a frame. One frame is equivalent to six samples of each of left and right stereo channels.

Figure 2:
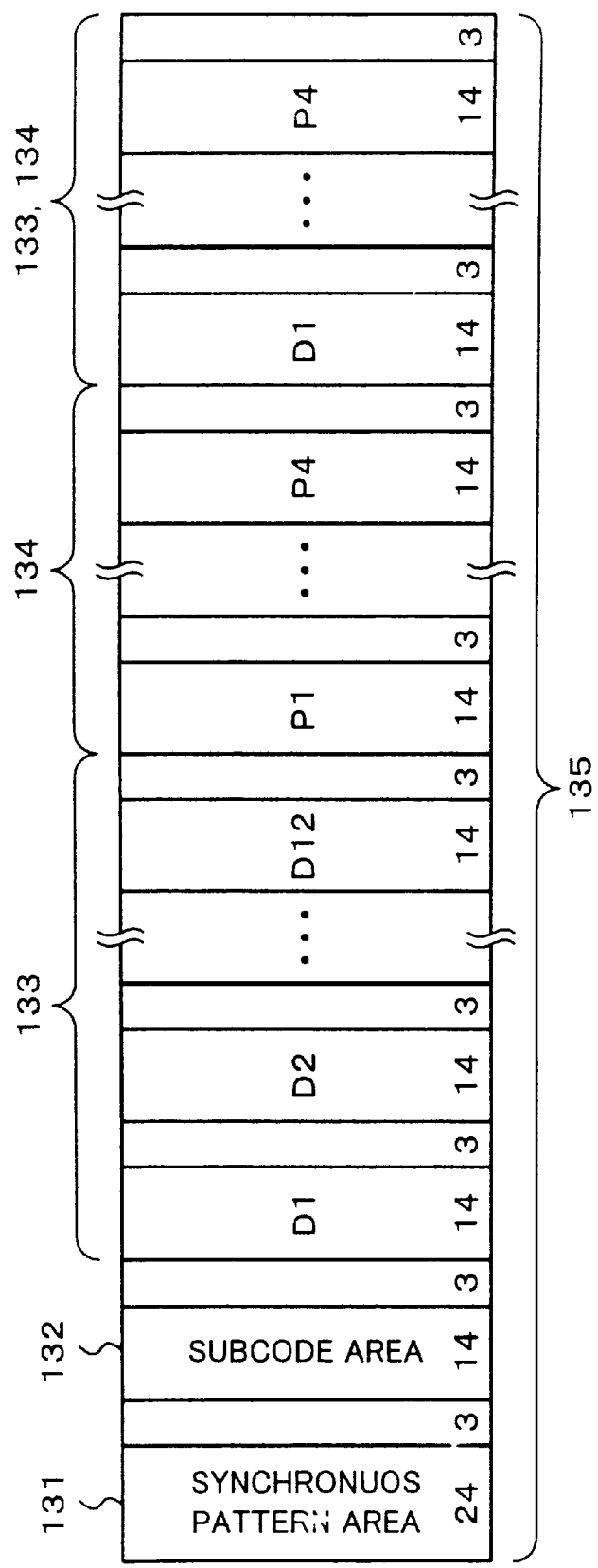
FIG. 2 is a schematic diagram showing the data structure of one frame recorded on the optical disc.

By EFM (Eight to Fourteen) modulation, each symbol is converted from eight bits into 14 bits. FIG. 2 shows the data structure of one frame that has been EFM-modulated. One frame 135 is composed of a synchronous pattern data area 131, a subcode area 132, a program data area 133, and a parity data area 134. The synchronous pattern data area 131 is composed of 24 channel bits. The subcode area 132 is composed of 14 channel bits. The program data area 133 is composed of 12 symbols of program data D1 to D12. The parity data area 134 is composed of four symbols of parity data P1 to P4. The program data area 133 and the parity data area 134 are followed by pairs of other program area 133 and other parity data area 134. Each area or each data is connected with three channel bits. One frame 135 is composed of a total of 588 channel bits.

Figure 3:
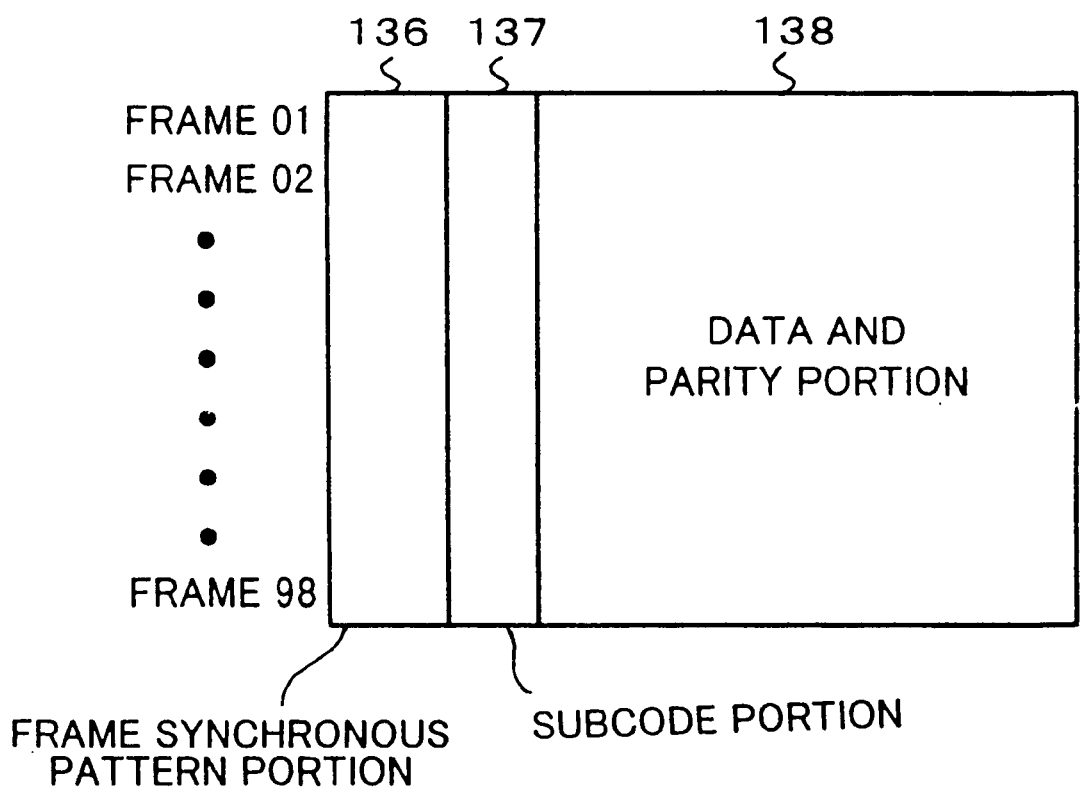
FIG. 3 is a schematic diagram showing the data structure of a sub-code frame according to the present invention.

FIG. 3 shows a data structure of which areas and data portions of 98 frames 135 are successively arranged in the vertical direction. The interval of 98 frames is equal to one subcode. Th is interval is referred to as a subcode frame. The subcode frame is composed of a frame synchronous pattern portion 136, a subcode portion 137, and a data and parity portion 138. One subcode frame is equivalent to 1/75 second of the reproducing time of a CD.

Subcode data containing data of P and Q channels is recorded in the subcode portion 137 shown in FIG. 3. FIG. 4 shows the data structure of a subcode frame of the subcode portion 137. The first frame F01 and the second frame F02 are synchronous patterns S0 and S1 of the subcode frame, respectively. As with the frame synchronous pattern, the synchronous patterns of the subcode frame are out-of-rule patterns of the EFM modulation system. Eight bits of one symbol compose P to W channels of the subcode. For example, the P channel is composed of parts of the synchronous patterns S0 and S1 and P01 to P96.

The P channel of the subcode has information that represents whether or not a program is present. The Q channel has absolute time information of a CD, time information of each program, a program number (also termed track number), an index number, and so forth. Thus, with the information of the Q channel, the reproducing operation such as a program selecting operation can be controlled. In addition, with the information of the Q channel, the user can visually know the sequence number of a current program on an optical disc, the elapsed time of the program, the absolute time of the program, and so forth.

In addition, data of six channels of R to W channels of the subcode can be used for displaying for example a still picture and a text of a program. A reproducing apparatus using such R to W channels for a still picture and a text of a program is referred to as CD-graphics player. Recently, a CD-TEXT disc for recording additional character information with the R to W channels of the lead-in area has been proposed. In the case of a CD-TEXT disc, up to around 6500 characters can be recorded with the lead-in area. Alternatively, the additional character information of a CD-text disc may be restricted to around 800 characters so that it can deal with eight languages. Thus, one CD-TEXT disc can have a title in eight languages such as English, Japanese, French, German, Chinese, and Hangul.

FIG. 5A shows data recorded on a compact disc. As described in FIG. 1, TOC data in the lead-in area 103, programs No. 1 to No. n in the program area 104, and data in the lead-out area 105 are outer-circumferentially recorded.

TOC data of a conventional compact disc is recorded in a Q channel of a subcode as shown in FIG. 5B. The subcode has a data structure of which one frame is composed of 98 bits. The 72 bits of the 98 bits are data. The TOC data has a format as shown in FIG. 5B.

FIG. 6 shows the data structure of the TOC in the case that the number of programs is six. In the case that POINT ranges from 00 to 99, PMIN, PSEC, and PFRAME represent the start address (absolute time) of each program. In the case that POINT is A0, PMIN represents the program number of the first program of the disc. In this case, PSEC and PFRAME are 00. In the case that POINT is A1, PMIN represents the program number of the last program. In this case, PSEC and PFRAME are 00. In the case that POINT is A2, PMIN, PSEC, and PFRAME represent the start address of the lead-out area. As shown in FIG. 6, these data portions are repeated three times. In addition, these data portions are repeatedly recorded in the lead-in area. The TOC data is read by the reproducing apparatus when a CD is loaded thereto. The TOC data is stored in a memory of the apparatus.

Figure 7:
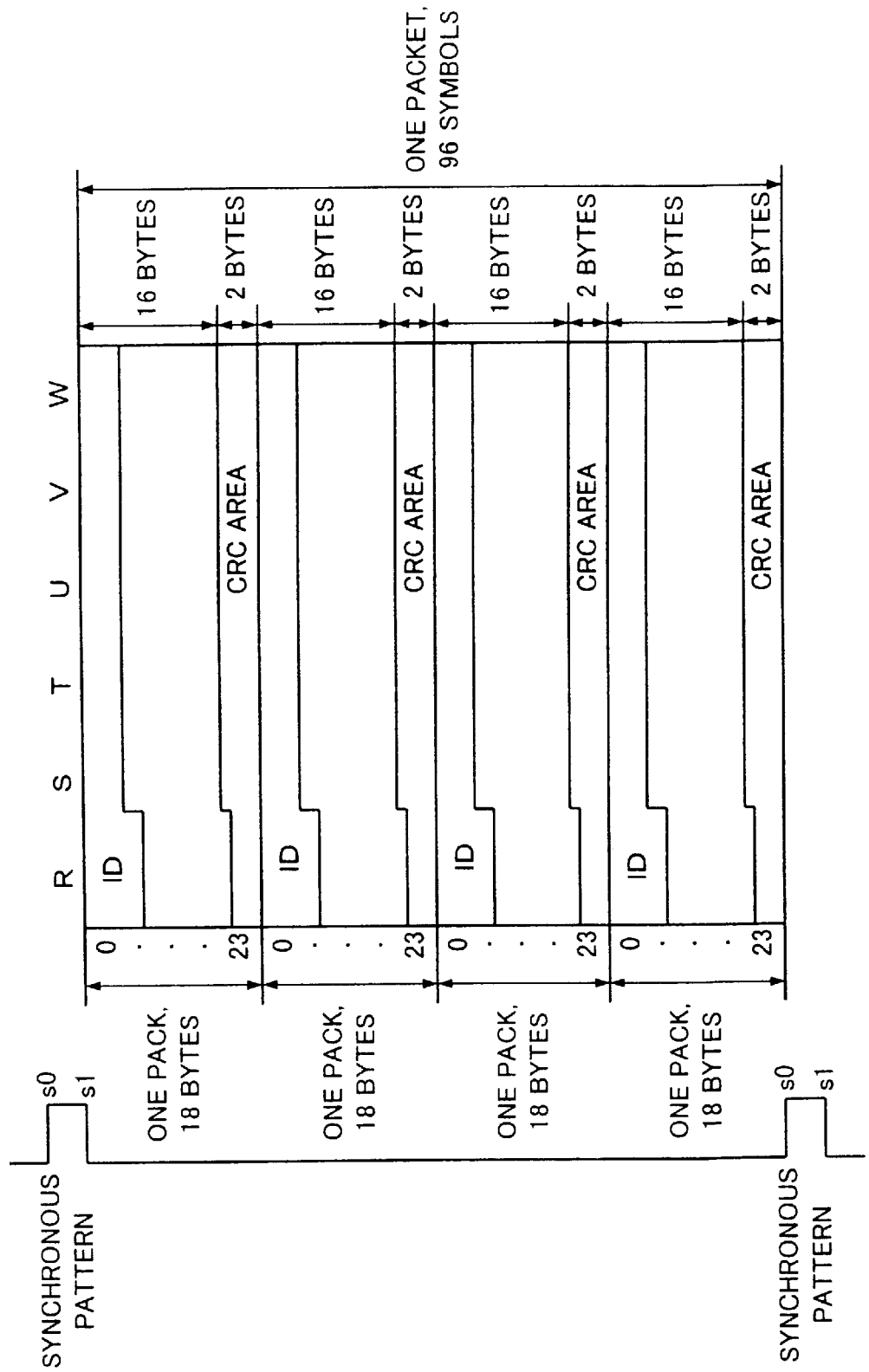
FIG. 7 is a schematic diagram showing the data structure of R to W channels of subcode.

FIG. 7 shows the data structure of the TOC of a CD-TEXT disc (mode 4) according to an embodiment of the present invention. In a conventional CD, as described above, with 72 bits of one frame of the Q channel in the subcode, the number of programs and record positions of individual programs are managed. In reality, a program number that ranges from 00 to 99, a start address (absolute time) of each program, the first program number, the last program number, and the start address of the lead-out area are recorded. In addition to the Q channel of the subcode, data composed of R to W channels as shown in FIG. 7 is recorded as TOC data.

The first two frames of data composed of R to W channels are synchronous patterns S0 and S1, respectively. The remaining 96 frames contain 96 symbols (one symbol is composed of six bits). The 96 symbols are divided into four portions (one portion is composed of 24 symbols). The 24 symbols are referred to as one pack. Four packs are referred to as one packet.

Each pack starts with an ID area 1 composed of a total of 24 bits of mode information and ID codes (ID1, ID2, ID3, and ID4). The mode information represents a record mode of information recorded on the pack. ID1 represents the type of text information. The other ID2, ID3, and ID4 represent other identification information. The ID area 1 is followed by a text area 2 that has text information in association with main data. The text information is recorded as blocks (one block is composed of eight bits). Each pack has a CRC (Cyclic Redundancy Code) area 3 that is composed of 16 bits. With the cyclic code, an error is detected.

Figure 8:
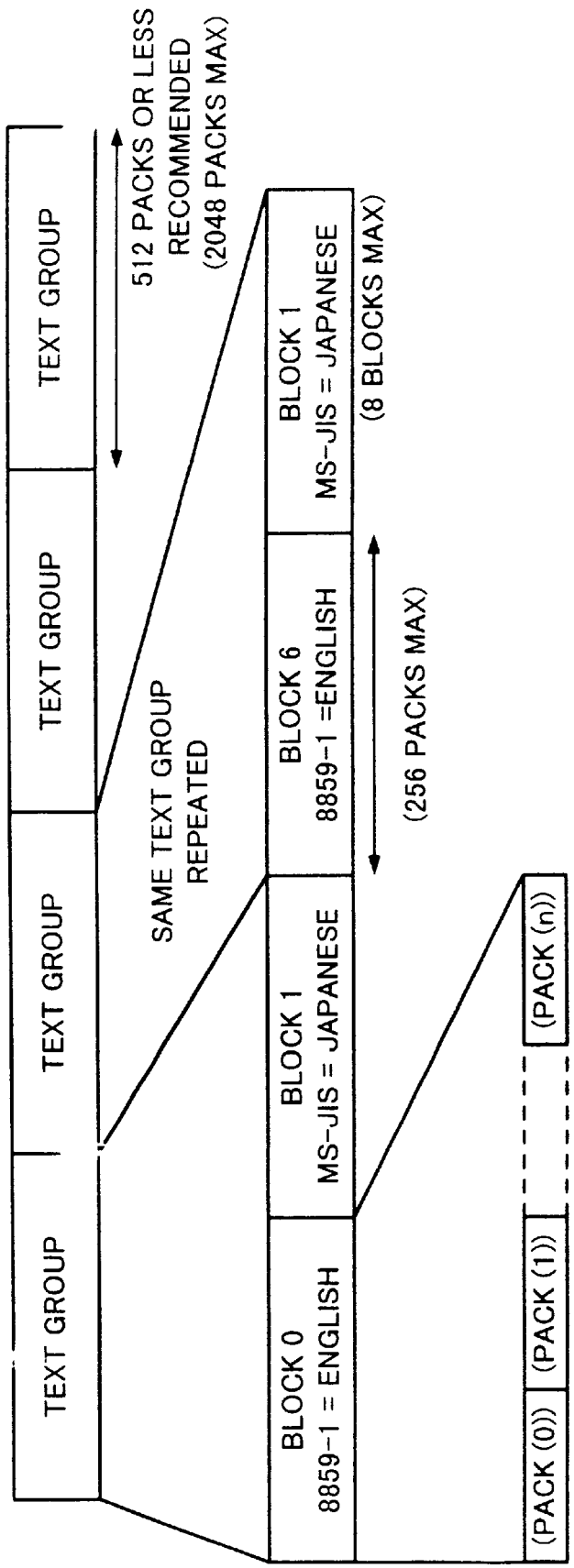
FIG. 8 is a schematic diagram showing the data structure of a blocked text group, a block composing a text group, and a plurality of packs composing a block.

FIG. 8 shows an outlined CD-TEXT disc format. All character information is recorded in a text group. In the lead-in area, the same text group is repeatedly recorded. One text group is composed of up to eight blocks. FIG. 8 shows that one text group is composed of two blocks (block 0 and block 1).

The block 0 has English character information corresponding to character code 8859-1. The block 1 has Japanese character information corresponding to character code MS-JIS (Microsoft©—Japanese Industry Standard). Each block is composed of pack 0 to pack n.

Figure 9A:
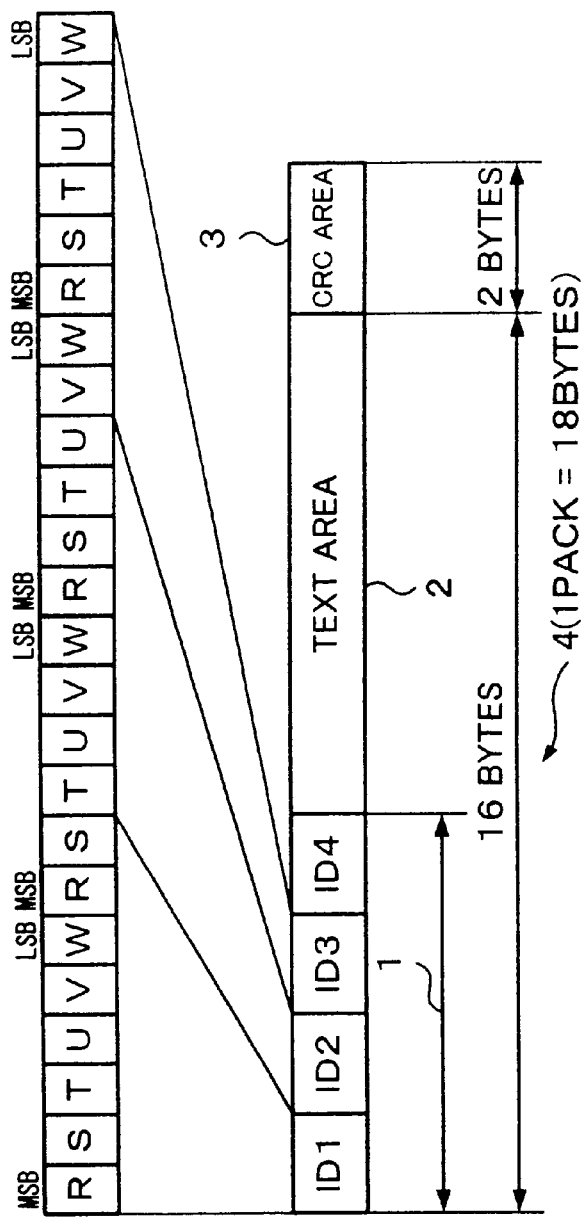
FIG. 9A is a schematic diagram showing the data structure of a pack.

FIG. 9A is a schematic diagram showing the data format shown in FIG. 7 as serial data. As shown in FIG. 9A, 32 bits are divided by eight (one byte) and assigned to ID1, ID2, ID3, and ID4 as an ID (header) area 1. The ID area 1 is followed by a text area 2. The text area 2 is divided into byte data. The text area 2 has a length of 12 bytes. The text area 2 is followed by a CRC area 3. The CRC area 3 has a length of two bytes. A total of 18 bytes of the ID area 1, the text area 2, and the CRC area 2 are referred to as a pack. Thus, since the data of the CD-TEXT disc can be processed as byte data, the same method as that for the Q channel of a signal can be used. Consequently, the processing circuit for a CD-TEXT disc becomes simple.

In the data format of the CD-TEXT disc, an error is detected with CRC error detection code. When an error is detected, the same data is read. Thus, the same data is written four times for each pack. In addition, a data sequence is repeatedly recorded in each packet. In other words, one packet that synchronizes with a subcode sync at intervals of 1/75 second has four packs. In such a redundant recording method, a complicated error correcting circuit can be omitted.

In the redundant recording method, the number of recording times is not limited to four. In addition, the redundant recording method may be performed packet by packet or every a plurality of packets rather than pack by pack.

Figure 9B:
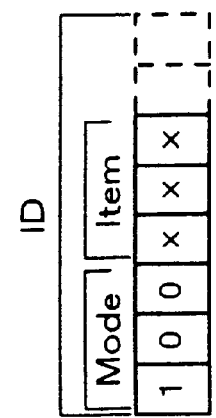
FIG. 9B is a schematic diagram showing the data structure of an ID signal of a pack.

As shown in FIG. 9B, the ID1 of the ID area 1 is handled with eight bits that are larger than one symbol by two bits. In addition, in the case that a CD-TEXT disc is loaded to a CD reproducing apparatus that has a function for decoding R to W channels of subcode to prevent the apparatus from malfunctioning, mode identification data is written to high order three bits from MSB. In the case of the CD-TEXT format recorded in the lead-in area, mode 4 "100" that has not been defined is assigned as the mode represented by the three bits. Thus, even if a CD-TEXT disc is loaded to a conventional reproducing apparatus, it only detects an unrecognizable mode. Consequently, the reproducing apparatus only stops the operation, not malfunctions. Alternatively, mode 5 or mode 6 that have not been defined may be used instead of the mode 4.

Figure 10A:
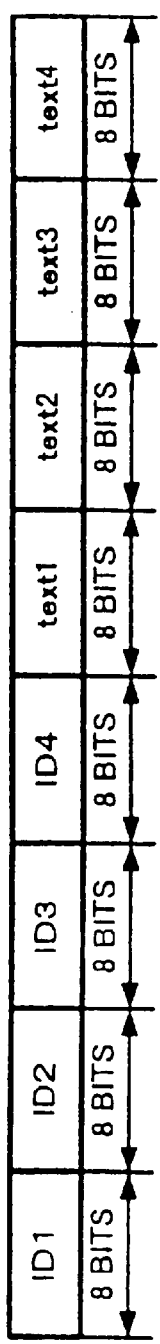
FIG. 10 is a schematic diagram showing a data format according to the present invention.
Figure 10B:
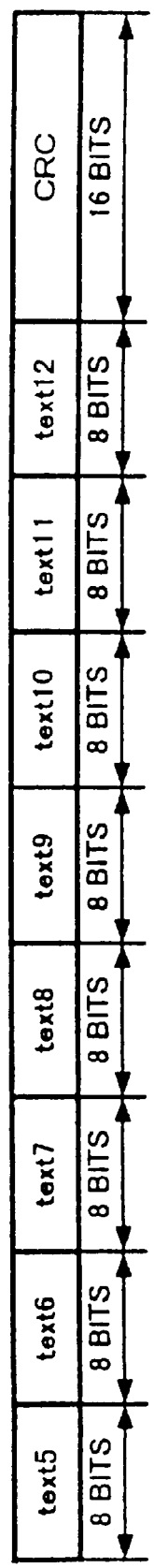

As shown in FIG. 10, in the example of which the ID1 represents the mode 4, one pack has ID1, ID2, ID3, ID4, text bytes text to text 12 and a CRC code that are composed of eight bits (one byte) except for the CRC code composed of 12 bits.

Figure 11:
FIG. 11 is a schematic diagram showing IDI representing an identifier of character data displayed as a text and the types of identifiers.

The ID1 has a length of eight bits. FIG. 11 shows the contents of the ID1. As described above, to represent the mode 4 with high order bits, the ID1 is represented as (8xh) (where h represents hexadecimal number; and x represents a low-order four bit value).

ID1 represents the content of the character string contained in text1 to text12. (80h) represents an album name/program name, (81h) represents a performer name/conductor name/orchestra name. (82h) represents a songwriter name. (83h) represents a composer name. (84h) represents an arranger name. (85h) represents a message.

(86h) represents a disc ID. (87h) represents a search keyword. (88h) represents a TOC. (89h) represents a 2nd TOC. (8ah), (8bh), and (8ch) are reserved. (8dh) represents closed information. (8eh) represents UPC/EAN (POS code) of an album and ISRC of each track. (8fh) represents a size. "Reserved" represents an area that is currently not defined. Thus, an area "reserved" will be defined in the future.

Figure 12:
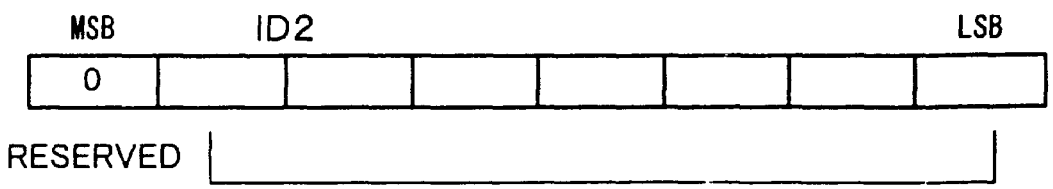
FIG. 12 is a schematic diagram showing ID2 representing a program number.

ID2 has a one-bit extension flag and 7-bit track number or 7-bit element number. The track number represents a track number of the first character of text data of the current pack. As shown in FIG. 12, ID2 represents a track number ranging from 1 to 99. Thus, other values such as "0h" and "100h" or higher of ID2 have special meanings. When ID2 is "00", it represents the entire disc. The MSB of ID2 is always "0". When the MSB of ID2 is "1", it represents an extension flag. The pack element number depends on the type of a pack represented by ID1.

Figure 13:
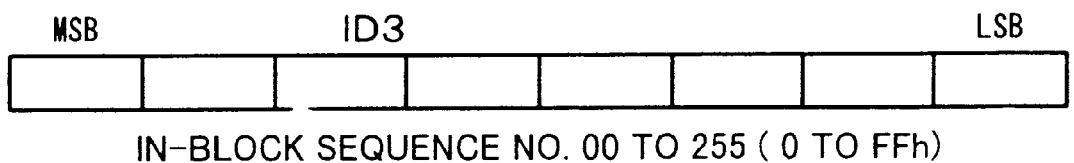
FIG. 13 is a schematic diagram showing ID3 representing a sequence number of a pack connected in a block.

ID3 represents a sequence number of the block. As shown in FIG. 13, the sequence number of the block ranges from "00" to "255" (0h to FFh). When ID3="0", it represents ID1=80h.

Figure 14:
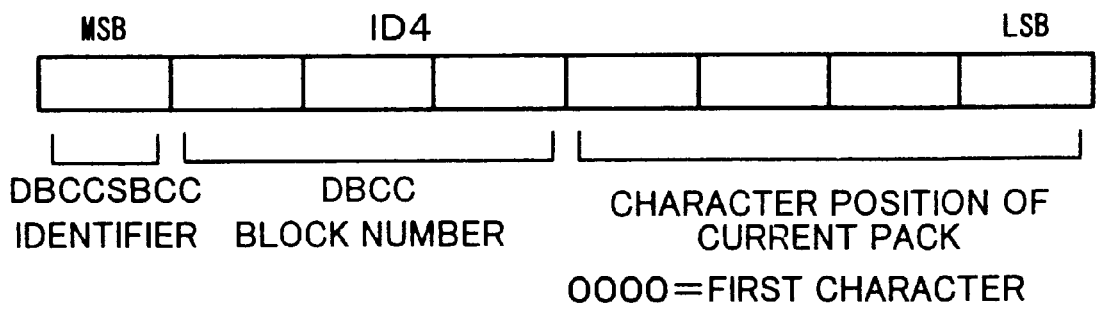
FIG. 14 is a schematic diagram showing ID4 representing an identifier of DBCC/SBCC, a DBCC block number, and a character potion of the current pack.

As shown in FIG. 14, ID4 has a length of eight bits. The first bit is a DBCC (Double Byte Character Code) identification bit (MSB). The next three bits represent block number. The last four bits represent the character position of the current pack. If the block includes a DBCC character string, the DBCC identification bit is "1". If the block includes a SBCC character string, the DBCC identification bit is "0". The block number represents a block number of the current pack. The last four bits represent the character position of text1 of the current pack. "0000" represents the first character. "0001" represents the second character. "0010" represents the third character. "00011", "0100", and so forth represent the fourth character, fifth character, and so forth, respectively.

As described above, the text data is composed of 12 bytes that include a character string or binary information that depends on the type of a pack represented by the ID1. In packs other than (ID1=88h), (ID1=89h), and (ID1=8fh), text data is composed of a character string. The character string includes a null code as a delimiter. In the case of SBCC, one null code is used. In the case of DBCC, two null codes are used. A null code is represented by (00h). The size of a character string is preferably 160 bytes or less.

FIGS. 15, 16, and 17 show the structure of a pack (ID1=8fh) that represents block size information according to the present invention. FIG. 15 shows the data structure of a pack in the case that the pack element number represented by the ID2 is (00h). FIG. 16 shows the data structure of a pack in the case that the pack element number represented by the ID2 is (01h). FIG. 17 shows the data structure of a pack in the case that the pack element number represented by the ID2 is (02h).

In a pack (ID2=00h) (see FIG. 15), an ID3 represents a sequence number. An ID4 represents a block number. text1 represent a character code of the block. The character code is used in a character string of a pack (ID1=80h to 85h). The character code of the other packs is (00h). The character code of the block 0 is (00h). For example, the character code is defined as follows.

00h=ISO (International Standard Organization) 8859-1
01h=ISO 646, ASCII
02h to 7F=Reserved
80h=MS-JIS
81h=Korean character code
82h=Mandarin (standard) Chinese character code
83h to FFh=Reserved For example, in ISO 8859-1, each of numeric characters, alphabet characters, symbols, and so forth is represented by one byte. ISO 8859-1 is used as standard character code.

text2 represents the first track number. text3 represents the last track number. text4 represents mode 2 and a copy protection flag. One bit of text4 represents whether or not a CD text packet of the mode 2 has been encoded in a program area. The remaining seven bits represent a copy protection flag. text5 to text12 each represent the number of packs (ID1=80h) to (ID1=87h), respectively.

As with a pack shown in FIG. 15, in a pack (ID1=8fh and ID2=01h), the ID3 and the ID4 represent a sequence number and a block number, respectively. text1 to text8 each represent the number of packs (ID1=88h) to (ID1=8fh), respectively. text9 to text12 each represent the last sequence number of the block 0 to block 3, respectively.

As with the packs shown in FIGS. 15 and 16, in a pack (ID1=8fh and ID2=02h) (see FIG. 17), the ID3 and the ID4 represent a sequence number and a block number, respectively. text1 to text4 each represent the last sequence number. When the last sequence number is (00h), it represents that the relevant block is not present. A block that is not present is referred to as non-data block. text5 to text12 represent language codes of the block 0 to block 7, respectively. Character code represents the type of the format of data. On the other hand, language code represents a language in which character information of each block is written.

FIGS. 18 and 19 are tables showing examples of the relation between language codes (one byte) and language names. FIG. 18 shows a table representing language codes used in Europe. FIG. 19 shows language codes used in other countries. These language codes are only examples. Thus, language codes corresponding to another definition may be used.

Figure 20:
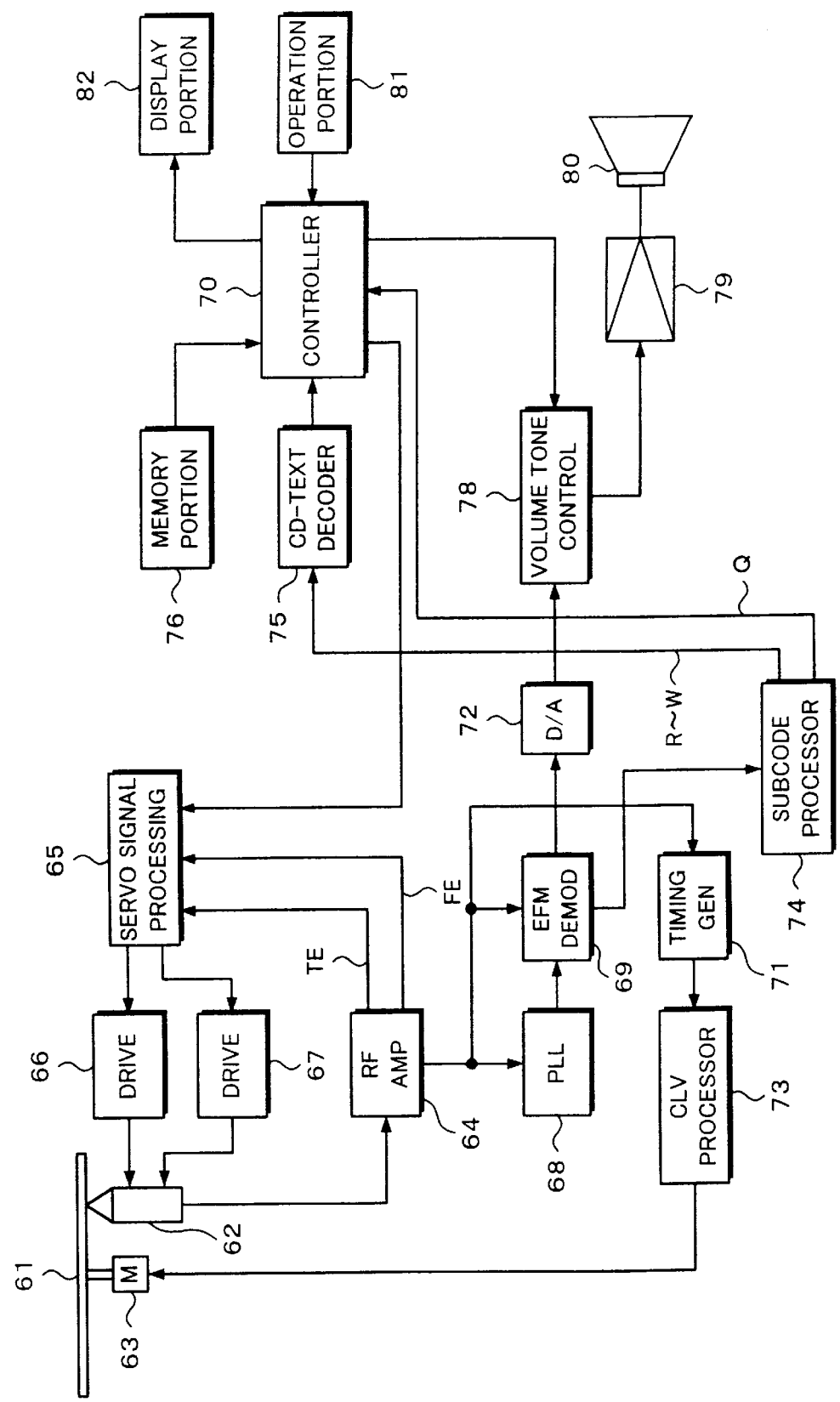
FIG. 20 is a block diagram showing the structure of an optical disc reproducing apparatus for a CD-TEXT disc according to the present invention.

FIG. 20 shows an example of the structure of a reproducing apparatus that reproduces a program from a CD-TEXT disc that has a format in which character (additional) information is recorded in the lead-in area thereof. Referring to FIG. 20, reference numeral 61 is a CD-TEXT disc from which a program is reproduced. The CD-TEXT disc 61 is rotated and driven by a spindle motor 63. An optical pickup 62 reads a program recorded on the CD-TEXT disc.

An output signal of the optical pickup 62 is supplied to an RF amplifier 64. The RF amplifier 64 has an RF signal processing circuit that digitizes the RF signal and generates a tracking error signal TE and a focus error signal FE. The error signals TE and FE are supplied to a servo signal processing circuit 65. The servo signal processing circuit 65 performs a focus controlling process and a tracking controlling process. A focus actuator and a tracking actuator in the optical pickup 62 are driven corresponding to signals received from driving circuits 66 and 67, respectively. A unit (not shown) that moves the pickup 62 in the radial direction of the disc is controlled by the servo signal processing circuit 65. The servo signal processing circuit 65 has an interface that receives a control command from the controller 70.

A digitized reproduction signal received from the RF amplifier 64 is supplied to a PLL 68 (Phase Lock Loop) 68, an EFM demodulating circuit 69, and a timing generating circuit 71. The PLL 68 generates a clock signal that synchronizes with the reproduction signal. The EFM demodulating circuit 69 performs digital signal processes such as EFM demodulating process and error correcting process. A digital audio signal received from the EFM demodulating circuit 69 is supplied to a D/A converter 72. The D/A converter 72 converts the digital audio signal into an analog audio signal. The analog audio signal is supplied to a volume tone controlling portion 78. The volume tone controlling portion 78 is controlled corresponding to a control signal received from the controller 70. A speaker 80 is connected to the volume tone control portion 78 through an audio output amplifier 79.

An output signal of the RF amplifier 64 is supplied to a timing generating circuit 71. The timing generating circuit 71 generates a timing signal that synchronizes with the reproduction signal. An output signal of the timing generating circuit 71 is supplied to a CLV (Constant Linear Velocity) processor 73. The CLV processor 73 drives the spindle motor 63 at CLV.

In the reproducing apparatus shown in FIG. 20, a subcode separated by the EFM demodulating circuit 69 is supplied to the subcode processor 74. The subcode processor 74 performs a subcode error detecting process and so forth and separates Q channel and R to W channels from the subcode. The Q channel of the subcode is supplied to the controller 70. The R to W channels of the subcode are supplied to a CD-text decoder 75.

The CD text decoder 75 decodes R to W channels of subcode. The CD text decoder 75 has a RAM with a small capacity. The RAM outputs data corresponding to a request issued from the controller 70. The controller 70 selects required data from the CD text data. The selected data is stored in a memory portion 76. In addition to character information reproduced from the lead-in area of the CD-TEXT disc and then decoded, ID information, digest information, size information, and so forth are stored in the memory portion 76. The memory portion 76 is composed of a RAM and a ROM.

The CD text decoder 75 detects an error of the CD text data. As described above, an error of CD text data is detected with an error correction code (cyclic redundancy code: CRC) for each pack. In the redundancy recording format, only when CRC check results for a plurality of redundancy packs are errors, an error flag that represents that the relevant pack has an error is set. In addition to the CD test data, the error detection flag is supplied to the controller 70. The controller 70 references the error detection flag and determines whether or not character information with the CD text data can be displayed. When the CD text data cannot be correctly read or decoded due to dust adhered on the CD-TEXT disc or a scratch thereon, the controller 70 issues an alarm.

The controller 70 issues a command to the servo signal processing circuit 65 so as to control the servo system and the decoding process. In addition, the controller 70 controls the operation of the reproducing apparatus. A display portion 82 including a display driver is connected to the controller 70. The display portion 82 is for example a liquid crystal display unit. The display portion 82 may be an external display device such as a TV monitor connected to the reproducing apparatus. The display portion 82 displays character information such as CD text. In addition, when the reproducing apparatus cannot read CD text, the display portion 82 displays an alarm. Moreover, the display portion 82 displays the type of language of the CD text data recorded on the CD-TEXT disc loaded in the reproducing apparatus.

An operation portion 81 sends an operation signal to the controller 70. The operation portion 81 has disc reproduction keys, program selection keys, program search keys, and so forth. In addition, the operation portion 81 has a mouse that allows the user to move the cursor on the screen of the display portion 82 and to operate the reproducing apparatus.

Figure 21:
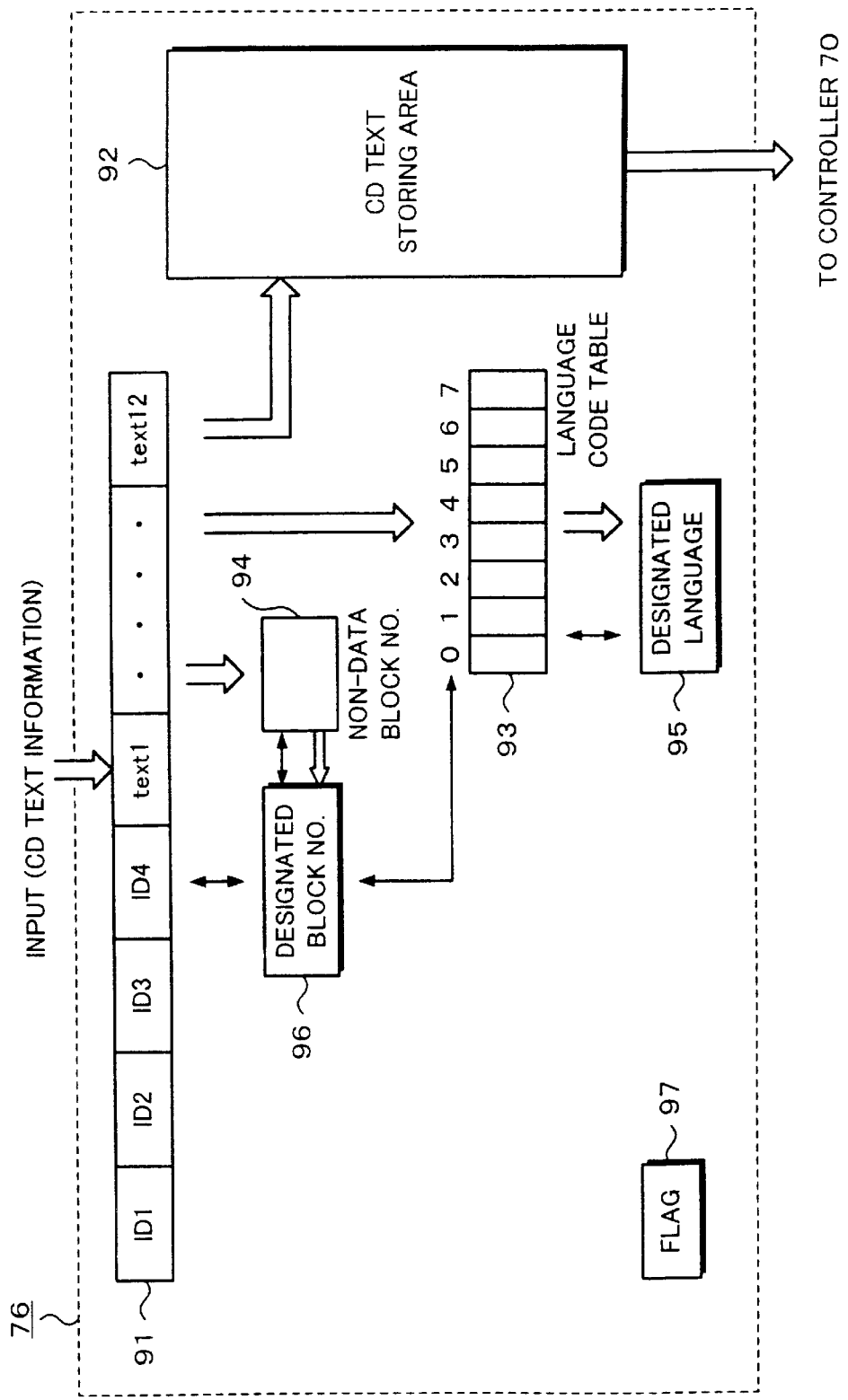
FIG. 21 is a block diagram showing the structure of a memory portion 76 shown in FIG. 20.

FIG. 21 is a functional block diagram showing a portion corresponding to the present invention. CD text information that has been decoded by the CD text decoder 75 is supplied to a memory portion 76 under the control of the controller 70. A buffer 91 in the memory portion 76 stores one pack of input CD text information labeled as ID1 to text12. The buffer 91 is connected to a CD text storing area 92, a language code table 93, and a non-data block number storing portion 94. The language code table 93 stores language codes of block 0 to block 7.

A memory 95 that stores a designated language (language code) corresponding to the language code table 93 is disposed. In addition, a memory 96 that stores a designated block number to which CD text information that has been reproduced from the loaded CD-TEXT disc is read is disposed. Whenever a CD-TEXT disc is loaded, initial value 0 as a designated block number is stored to the memory 96. Moreover, a flag memory 97 that stores a flag that represents whether the language code determining process has been completed is disposed.

The character information read from the CD text storing area 92 is output to the controller 70. The controller 70 causes the display portion 82 to display character information. Alternatively, the controller 70 may communicate with another reproducing apparatus and cause it to display character information.

Figure 22:
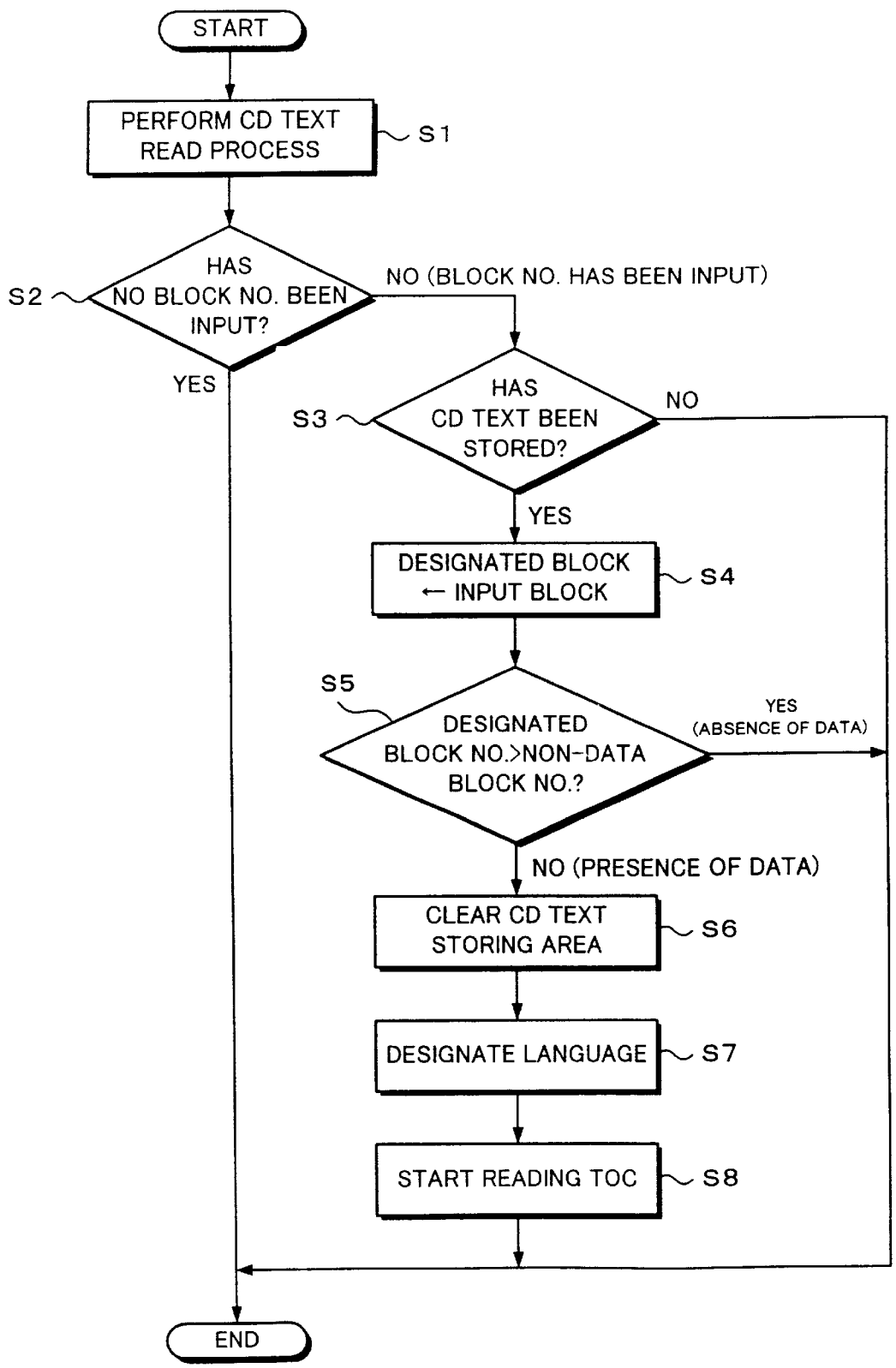
FIG. 22 is a flow chart showing a process for storing a language from a plurality of languages as a designated language.

Next, with reference to flow charts shown in FIGS. 22 to 25, a process of the portion shown in the functional block diagram of FIG. 21 will be described. FIG. 22 shows a main routine of the process. First of all, a CD text reading process is performed (at step S1). As will be described later, this process is composed of a process for reproducing CD text and storing it to the buffer 91, a CD text storing process, a size pack process, and so forth.

When the CD text reading process is completed (at step S1), it is determined whether or not a block number has been input (at step S2). When the determined result at step S2 is Yes, since it is not necessary to change the designated language, the process is completed. A block number is input with a key disposed in the operation portion. Alternatively, in the CD text reading process (at step S1), a language name may be displayed. In this case, with reference to the language name displayed on the display portion, the user designates a language name to be used in the reproducing apparatus.

When the determined result at step S2 is No, it is determined whether or not CD text has been stored (at step S3). When the determined result at step S3 is Yes, the input block number is stored as a designated block number (at step S4).

Next, it is determined whether or not the designated block number is a non-data block number (at step S5). Since CD text is stored in the ascending order of block numbers, by comparing the first non-data block number with the designated block number, it is determined whether or not CD text data has been recorded to the designated block number. When the determined result at step S5 is Yes, since a number designation error has taken place, the flow returns to a step for waiting for a block number.

When the determined result at step S5 is No, the flow advances to step S6. At step S6, the CD text storing area 92 is cleared. Thus, the CD text storing area 92 is restored to the initial state. At step S7, a language is designated. At step S8, TOC is re-read instead of the TOC read operation at step S1. The TOC is re-read for only the designated block number.

The block number is obtained with the ID4 of each pack. Thus, CD text data in a language designated by the user is read to the memory portion 76 of the reproducing apparatus.

Figure 23:
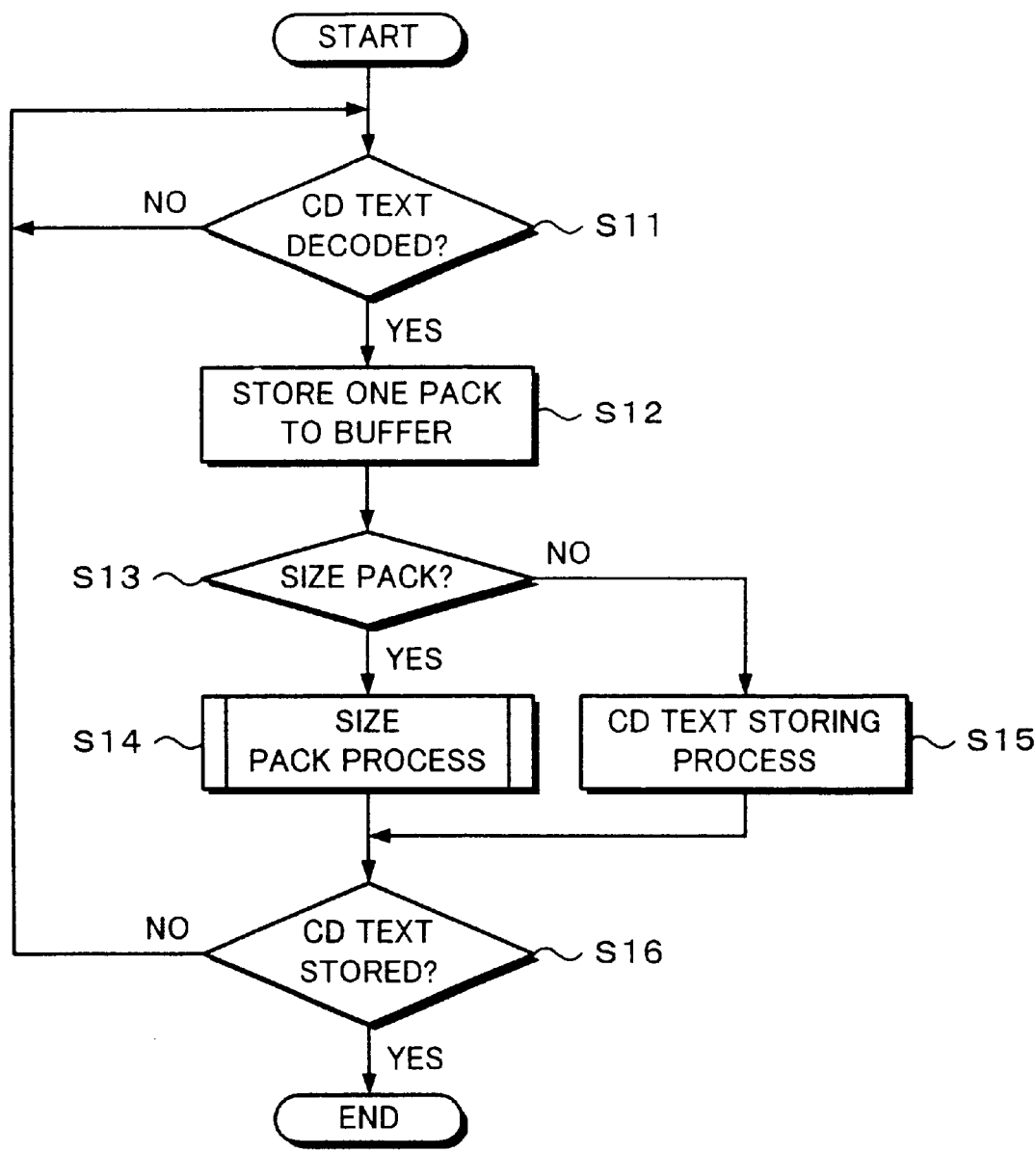
FIG. 23 is a flow chart showing a process for displaying a plurality of languages.

Next, with reference to FIG. 23, the CD text reading process S1 will be described. The CD text reading process S1 is performed when a new CD-TEXT disc is loaded. First of all, it is determined whether or not CD text has been decoded (at step S11). In reality, when a CD-TEXT disc is loaded to a disc rotating portion, the disc is rotated. Data recorded on the disc is read by the optical pickup. In other words, TOC data is read from a lead-in area. CD text information is read from R to W channels of the TOC data. The CD text information is decoded by the CD text decoder 75. In addition, an error in the decoded CD text information is detected with CRC code added to each pack. Next, it is determined whether or not all redundantly recorded packs have errors. When all the redundantly recorded packs have errors, an error detection flag for these packs is set. Redundantly recorded packs that have no errors are treated as valid CD text information.

The decoded CD text information is supplied to the memory portion 76 under the control of the controller 70. Data of one pack is stored to the buffer 91 (at step S12). It is determined whether or not the one pack is a size pack with the ID1 (at step S13). When the determined result at step S13 is Yes (ID1=8fh), since the one pack is a size pack, the flow advances to step S14. At step S14, a size pack process is performed. When the determined result at step S13 is No, since the one pack is not a size pack, a CD text storing process is performed (at step S15). In other words, data other.than the size pack is sent to the CD text storing area 92. The size pack process will be described later.

At step S16, it is determined whether or not the CD text information has been stored (namely, necessary CD text information has been stored in the CD text storing area 92). When the determined result at step S16 is No, the flow returns to step S11.

Figure 24:
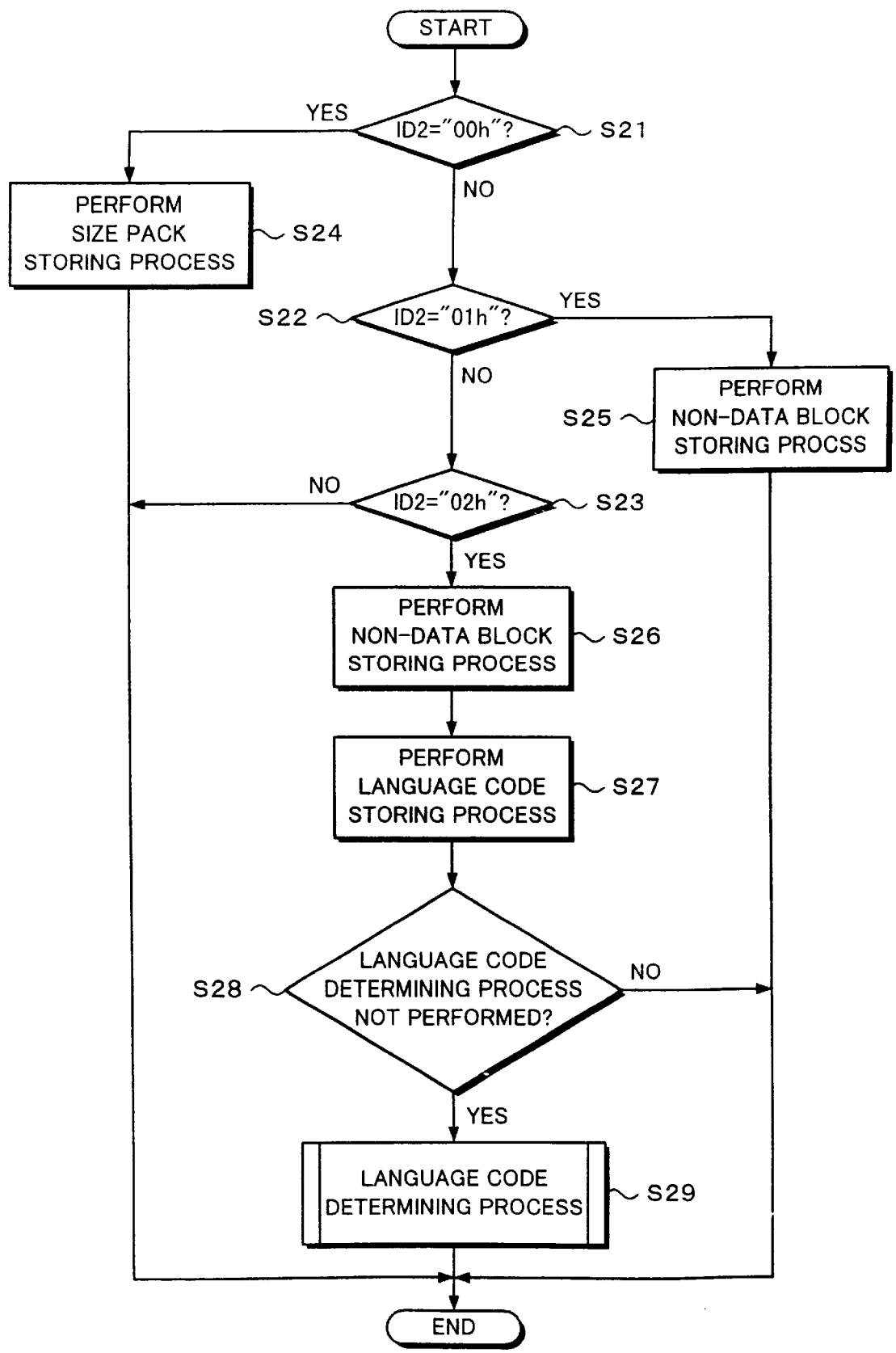
FIG. 24 is a flow chart of a subroutine showing a size pack process at step S14 shown in FIG. 23.

Next, with reference to a flow chart shown in FIG. 24, the size pack process (at step S14) will be described. At step S21, it is determined whether or not the ID2 of the pack stored in the buffer 91 is (00h). When the determined result at step S21 is No (namely, ID2 is not (00h)), the flow advances to step S22. At step S22, it is determined whether or not the ID2 is (01h). In addition, when the determined result at step S22 is No, it is determined whether or not the ID2 is (02h).

When the determined result at step S21 is Yes (namely, ID2=00h), the size pack is stored (at step S24). Thus, the size pack process is completed.

As described with reference to FIG. 16, text9 to text12 of a pack (ID2=01h) have last sequential information of the block 0 to block 3, respectively. Thus, with data of text9 to text12, it can be determined whether or not block 0 to block 3 are non-data blocks. Consequently, when the determined result at step S22 is Yes (namely, ID2=01h), the flow advances to step S25. At step S25, a non-data block (block number) is stored to the memory 94. Thus, the size pack process is completed.

In addition, as described with reference to FIG. 17, text1 to text4 of a pack (ID2=02h) have last sequential information of block 4 to block 7, respectively. Thus, with data of text to text4, it can be determined whether or not block 4 to block 7 are non-data blocks. text5 to text12 of a pack (ID2=02h) have language codes of block 0 to block 7, respectively.

Thus, when the determined result at step S23 is Yes (namely, ID2=02h), the flow advances to step S26. At step S26, a non-data block (block number) is stored to the memory 94. At step S27, a language code is detected from data of text5 to text12 of a pack (ID2=02h). The detected language code is stored to the language code table 93.

At step S28, it is determined whether or not the language code has been determined corresponding to a flag stored in the flag memory 97. Thus, when TOC of the same CD-TEXT disc is re-read, the language code determining process can be prevented from being redundantly performed. When the determined result at step S28 is Yes, the flow advances to step S29. At step S29, the language code determining process is performed. When the determined result at step S28 is No, the size pack storing process is performed without the language code determining process.

Next, with reference to a flow chart shown in FIG. 25, the language code determining process will be described. The language code determining process is performed whenever a CD-TEXT disc is loaded. A designated language is data represented by a language code. First of all, it is determined whether or not the designated language (stored in the memory 95) matches the initial value (at step S31). The initial value is (00h). When the determined result at step S31 is No, since no language has been designated, the flow advances to step S32. At step S32, a language is designated.

A language is designated by inputting a language code. Alternatively, a language name (for example, English) may be input. The input language name may be converted into the relevant language code corresponding to the language name table in the apparatus. Thus, it is necessary for the user to designate his or her desired language.

When the determined result at step S31 is Yes (namely, a language has been designated), the flow advances to step S33. At step S33, the designated language is compared with the language code table 93. At step S34, it is determined whether or not the language code table 93 has the designated language. The language code table 93 stores a language code corresponding to the loaded CD-TEXT disc. When the determined result at step S34 is No, the process is completed.

When the determined result at step S34 is Yes, the flow advances to step S35. At step S35, the block number of the matched language code is compared with the designated block number. At step S36, it is determined whether or not the block number of the matched language code matches the designated block number. When the determined result at step S36 is No, since a desired block is being read, the determining process is completed. Thus, the language code determining process exits to the CD text reading process.

When the determined result at step S36 is Yes, the block number of the matched language code is written to the memory 96 corresponding to the designated block number (at step S37). Thereafter, the flow advances to step S38. At step S38, it is determined whether or not the designated block number has data. Since CD text is successively recorded from the block number 0, by comparing the first non-data block number with the designated block number, it is determined whether or not the designated block has CD text data. When the block number is equal to or larger than the non-data block number, it is determined that a number designation error takes place. The flow enters a step for waiting for another block number.

When the designated block number is smaller than the first non-data block number, at step S39, the CD text storing area 92 is cleared. Thus, the CD text that has been read is erased. Consequently, the CD text storing area 92 is restored to the initial state. At step S40, TOC is re-read instead of that at step S15 in the CD text reading process. The re-read TOC is data of the block of the language code corresponding to the designated language (namely, the designated block number). After the language code determining process is completed, the flag stored in the memory 97 represents the completion of the process.

The memory that stores a designated language may be a non-volatile memory. In this case, even if the power of the reproducing apparatus is turned off, the designated language can be stored.

Alternatively, with a memory that stores a plurality of designated languages, the number of designated times of each language is detected. Data of the language with the maximum designated number may be read as priority data.

In this case, designated languages 95 in the memory 76 shown in FIG. 21 are tabulated as follows. The number of designated times of each language is counted. Whenever the user designates a language, the counted value of the number of times is incremented.

| Language | Counter value |
| --- | --- |
| Japanese | 10 |
| English | 15 |
| French | 3 |
| Chinese | 0 |

As described above, according to the present invention, when text information has been recorded in a plurality of languages on a disc such as a CD-TEXT disc, text information in a language designated by the user can be automatically read. In other words, according to the present invention, text information in a language that the user desires can be read to the memory of the reproducing apparatus. In addition, the language designating operation that is performed corresponding to each record medium can be omitted.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproducing apparatus for reproducing at least one program, text information corresponding thereto, and a recorded language code for determining a language corresponding to the text information from a recording medium, the recording medium having a program area on which the at least one program is recorded and a management area on which the text information and the recorded language code are recorded, the reproducing apparatus comprising:

designating means for designating a designated language code corresponding to an operation of a user;

memory means for storing the designated language code;

comparison means for comparing the designated language code stored in said memory means with the recorded language code reproduced from the recording medium;

reproducing means for reproducing text information in accordance with the designated language code when a match results from the comparison;

counting and determining means for counting a number of times each language code of a plurality of language does has been designated, resulting in a plurality of designated number count values corresponding to said plurality of language codes, and for determining a maximum value of the plurality of designated number count values and a corresponding language code;

wherein said memory means further stores said plurality of count values, and wherein data corresponding to the language code with the maximum designated number count value is read as priority data in determining the designated language code.

2. A reproducing method for reproducing at least one program, text information corresponding thereto, and a recorded language code for determining a language corresponding to the text information from a recording medium, the recording medium having a program area on which the at least one program is recorded and a management area on which the text information and the recorded language code are recorded, the reproducing method comprising the steps of:

(a) designating a designated language code corresponding to an operation of a user;

(b) storing the designated language code to memory;

(c) comparing the designated language code stored in the memory with the recorded language code reproduced from the recording medium;

(d) reproducing the text information in accordance with the designated language code when a match results from the comparison;

(e) counting a number of times each language code of a plurality of language codes has been designated, resulting in a plurality of designated number count values corresponding to said plurality of language codes, and determining a maximum value of the plurality of designated number count values and a corresponding language code;

wherein said step of storing further stores said plurality of count values, and wherein data corresponding to the language code with the maximum designated number count value is read as priority data in determining the designated language code.

3. A method of reproducing at least one program, text information corresponding thereto, and a recorded language code for determining a language corresponding to the text information from a recording medium, the recording medium having a program area on which the at least one program is recorded and a management area on which the text information and the recorded language code are recorded, the reproducing method comprising the steps of:

storing a plurality of language codes and a plurality of counter values, wherein each of said plurality of count values is associated with a corresponding one of said plurality of language codes;

indicating, by a user, a designated language;

incrementing a corresponding one of said plurality of count values according to said designated language indicated by said user;

determining as a priority language one of said plurality of language codes having an associated count value that it highest; and reading data of the language with the highest associated count value.

4. An apparatus for reproducing at least one program, text information corresponding thereto, and a recorded language code for determining a language corresponding to the text information from a recording medium, the recording medium having a program area on which the at least one program is recorded and a management area on which the text information and the recorded language code are recorded, the reproducing apparatus comprising:

means for storing a plurality of language codes and a plurality of count values, wherein each of said plurality of count values is associated with a corresponding one of said plurality of language codes;

means for indicating, by a user, a designated language;

means for incrementing a corresponding one of said plurality of count values according to said designated language indicated by said user;

means for determining as a priority language one of said plurality of language codes having an associated count value that is highest; and means for reading data of the language with the highest associated count value.

5. An apparatus for reproducing at least one program, text information corresponding thereto, and a recorded language code for determining a language corresponding to the text information from a recording medium, the recording medium having a program area on which the at least one program is recorded and a management area on which the text information and the recorded language code are recorded, the reproducing apparatus comprising:

a memory configured to store a plurality of language codes and a plurality of count values, wherein each of said plurality of count values is associated with a corresponding one of said plurality of language codes;

an operation portion for a user to indicate a designated language; and a controller configured to control processing including the steps of:

incrementing a corresponding one of said plurality of count values according to said designated language indicated by said user, and determining as a priority language one of said plurality of language codes having an associated count value that is highest; and reading data of the language with the highest associated count value.

6. A reproducing apparatus for reproducing at least one program, text information corresponding thereto, and a recorded language code for determining a language corresponding to the text information from a recording medium, the recording medium having a program area on which the at least one program is recorded and a management area on which the text information and the recorded language code are recorded, the reproducing apparatus comprising:

an optical pickup;

an operation portion configured for a user to designated language code;

a memory configured to store the designated language code; and a controller configured to compare the designated language code stored in said memory with the recorded language code reproduced from the recording medium, wherein said controller is further configured to control said optical pickup to reproduce the text information in accordance with the designated language code when a match results from the comparison, wherein said controller is further configured to count a number of times each language code of a plurality of language codes has been designated, resulting in a plurality of designated number count values corresponding to said plurality of language codes;

wherein said controller is further configured to determine a maximum designated number count value of the plurality of designated number count values and a corresponding language code; and wherein said memory further stores the plurality of language codes, including said corresponding language code, and said plurality of designated number count values, and wherein data corresponding to the language code with the maximum designated number count value is read as priority data in determining the designated language code.

* * * * *

UNITED STATES PATENT AND TRADEMARK OFFICE
CERTIFICATE OF CORRECTION

PATENT NO. : 6,339,561
DATED : January 15, 2002
INVENTOR(S) : Teppei Yokota et al.

Page 1 of 1

It is certified that error appears in the above-identified patent and that said Letters Patent is hereby corrected as shown below:

Column 3,
Line 3, change "IDI" to -- ID1 --;
Line 12, change "potion" to -- portion --;
Line 25, change "Europa" to -- Europe --.

Column 4,
Line 37, change "Th is" to -- This --.

Column 6,
Line 54, first occurrence, change "text" to -- text1 --;
Line 54, second occurrence, change "text 12" to -- text12 --.

Column 7,
Line 33, change "00011" to -- "0011" --.

Column 11,
Line 31, change "other.than" to -- other than --;
Line 62, change "text" to -- text1 --.

Signed and Sealed this

Twenty-first Day of May, 2002

JAMES E. ROGAN
Director of the United States Patent and Trademark Office

Attest:

Attesting Officer